UNITED STATES PATENT OFFICE.

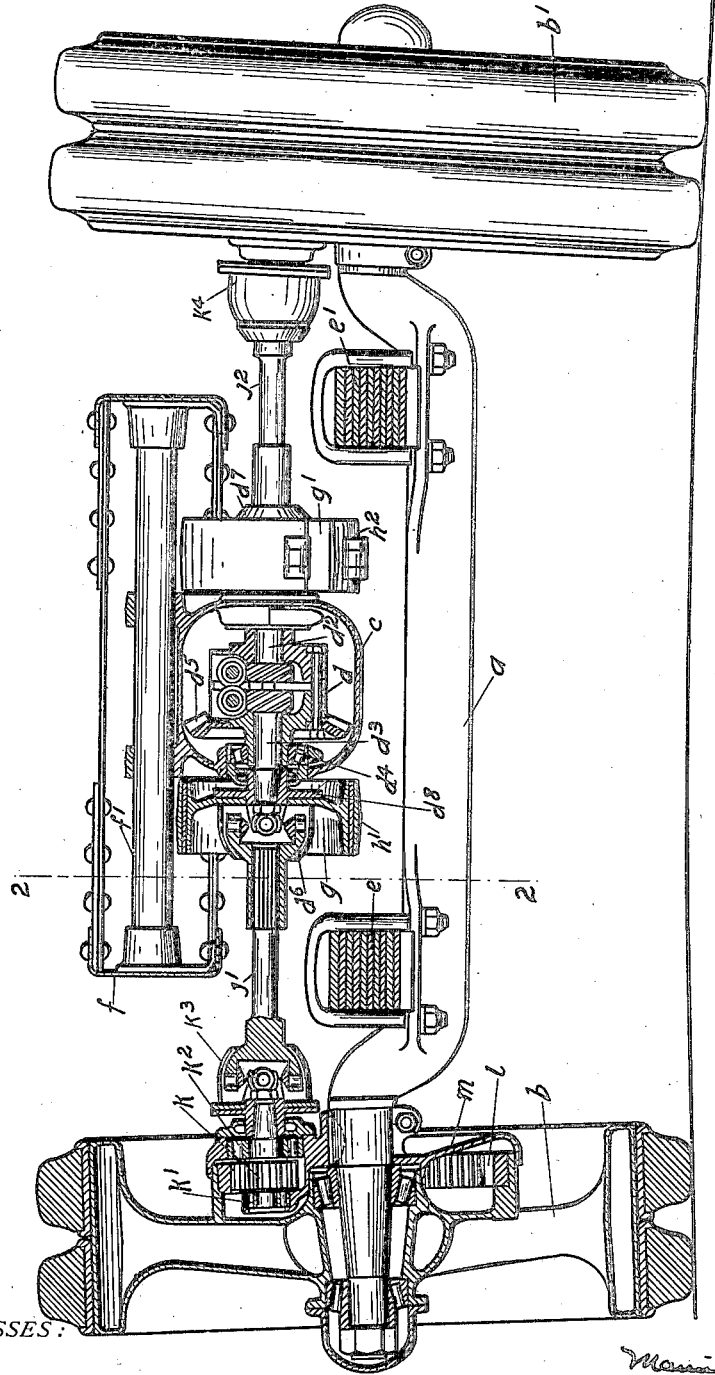

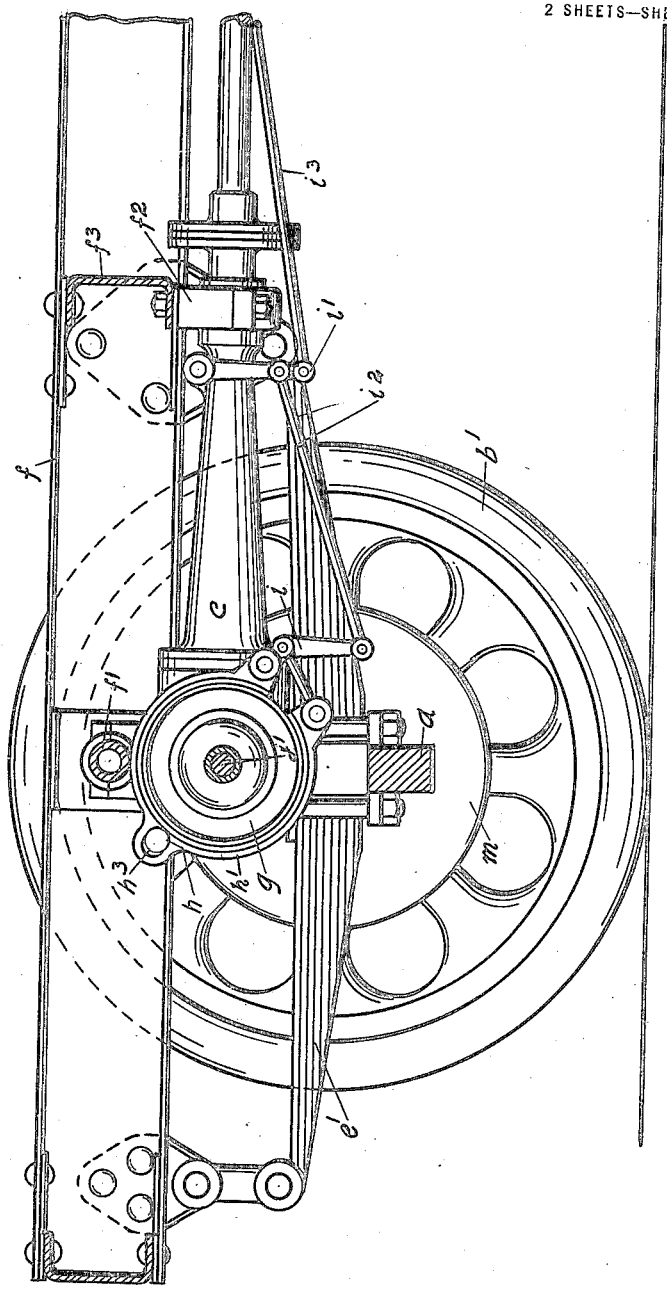

MAURICE WALTER, OF NEW YORK, N. Y., ASSIGNOR TO WALTER MOTOR TRUCK COMPANY, OF NEW YORK, N. Y., A CORPORATION OF NEW YORK.

BRAKE FOR MOTOR-VEHICLES.

1,377,863.

Specification of Letters Patent.

Patented May 10, 1921.

Application filed June 19, 1919. Serial No. 305,211.

*To all whom it may concern:*

Be it known that I, MAURICE WALTER, a citizen of the United States, residing in the borough of Manhattan of the city of New York, in the State of New York, have invented certain new and useful Improvements in Brakes for Motor-Vehicles, of which the following is a specification, reference being had to the accompanying drawings, forming a part hereof.

This invention relates to a unit construction for the drives of motor vehicles of the type in which power is transmitted from the differential to the rear wheels through Cardan shafts and is concerned particularly with the provision of brakes on the Cardan shafts. It is the principal object of the invention to mount the brake drums on the Cardan shafts and the brake bands to move with a differential housing which is mounted on the frame of the vehicle so that the braking force is applied at a point between the reduction at the differential and the reduction at the wheel and the brakes themselves move with the differential housing so that they are not subjected to the stresses and strains or liability of disalinement resulting from road shocks on the wheels or distortion of the frame proper. Another object of the invention is to provide brakes which shall be so mounted that they will be readily accessible for assembling or adjustment and will be protected from the usual deposits of mud and other foreign substances. From the manufacturer's standpoint the inclusion of the brakes in a driving unit of the character described affords many advantages in simplicity, compactness, assembling and disassembling and resulting cheapness.

The invention will be described in detail in connection with the accompanying drawings in which—

Figure 1 is a view partly in transverse section and partly in end elevation showing the chassis and a pair of wheels of a motor vehicle embodying the improvements.

Fig. 2 is a view in transverse section through the Cardan shaft, axle and frame of the vehicle shown in Fig. 1, a portion of the side frame members being indicated.

While the invention is shown as applied to the non-steering wheels of a motor truck, it will be evident as the description proceeds that it is equally applicable to motor vehicles of any type and to the driving shafts of steering or non-steering wheels. As illustrated in Fig. 1, the dead axle $a$ has journaled thereon the driving wheels $b, b'$ which are provided with internal gears $l$ with which are engaged driving pinions $k$ journaled, as at $k', k^2$ by stub shafts in gear flanges $m$ which inclose the gears and protect them in a manner well known. The pinions $k$ are driven by Cardan shafts $j', j^2$ which are connected therewith through suitable universal joints $k^3, k^4$ respectively. These Cardan shafts $j', j^2$ are in turn connected through suitable universal joints $d^6, d^7$, respectively, to the stub shafts $d^3, d^2$, respectively, of a suitable differential indicated generally at $d$. The differential $d$ is rotated through the usual master gear indicated at $d^5$ and has its stub shafts journaled in a differential housing $c$, the bearings for one of the shafts $d^3$ being indicated by the reference character $d^4$. The differential housing $c$ is supported by a transverse member $f'$ extending between the side frame members $f$ of the chassis and may have a front support $f^2$ on a transverse channel $f^3$ of the chassis. The chassis as usual may be supported by springs $e, e'$ on the axle $a$.

Considering now, for convenience, only the differential joint $d^6$, shown in section in Fig. 1, it will appear that one of the coupling members of the joint may be formed as a disk $d^8$ secured to the outer end of the differential stub shaft $d^3$. To this disk $d^8$ or any equivalent member is bolted or otherwise secured a brake drum $g$ with which coöperates a brake band $h'$ external or internal mounted on a stud $h$ carried by the differential housing $c$. This stud $h$ may rest in a slot $h^3$ formed at the point of support for the band $h'$ to permit the necessary limited movement thereof during application and release. The band $h'$ is applied or released by actuation of the levers $i, i'$ through suitable linkage $i^2, i^3$ extending to a point convenient for the operator.

A second brake drum $g'$ and brake band $h^2$ are associated with the other differential stub shaft $d^2$ in precisely the manner just described.

In the usual practice these separate brakes are provided for the vehicle wheels or a single brake is applied to the propeller shaft. Since the braking effort is dependent upon the frictional velocity of the rotating part at the point of application, it is evident that where the brakes are applied to the wheels this frictional velocity is low and a relatively great manual effort is required to attain a given braking force. Contrariwise, when the brake is applied to the propeller shaft the frictional velocity is so great, due to the speed of rotation of the shaft, that the braking effort is too great and impresses on the transmission objectionable stresses and causes skidding of the wheels at the moment of application. In the improved construction the brakes are applied at a point between the reduction at the differential and the reduction at the wheels and it is found that the frictional effect obtained at the speed of rotation of the Cardan shafts gives, for a given manual effort, the desired braking force and eliminates excessive stresses on any of the parts of the transmission and also reduces the skidding tendency upon application. Further, by mounting the brakes with the vehicle frame to move with the differential housing their alinement with the differential shafts always remains fixed regardless of any relative movement between the vehicle frame $f$ and the wheels and regardless of road movements of the wheels or distortion of the frame. The brakes are mounted well up under the frame and are accordingly well protected against the accumulation of mud and other foreign substances. The association of the brake drums with the universal joints in the Cardan shafts makes for the greatest simplicity in the assembling and disassembling of these units and, in fact, permits the entire drive unit and all of its associated parts to be assembled and shipped as a single unitary construction which may be readily applied to vehicles of any character. In use the brakes are readily accessible for purposes of adjustment and repair.

Still another advantage resulting from the improved construction resides in the ready absorption of the strains resulting from the torque reaction at the moment of application of the brakes by the vehicle springs and the transmission of these strains to the vehicle frame. Where a locking type of differential is employed it is evident that the braking force from one band is transmitted in equal degree through the differential to the opposite Cardan shaft so that a uniform braking effort is applied to both wheels even when one of the two brakes is entirely removed or for some reason becomes inoperative.

As indicated hereinbefore the invention is not limited to the precise details of construction or arrangement of parts shown, as it is evident that the advantages resulting from the improvements may be realized in structures which are changed to meet particular conditions of use as where, for instance, the differential housing and brakes are located in some other relation to the dead axle. All changes of the character indicated are to be deemed within the scope of this invention provided the advantages described herein are realized by employment of elements embodied in the relation set out in the accompanying claims.

I claim as my invention:

1. In a motor vehicle, in combination with the frame, axle and wheels thereof, a differential gear mounted on the frame to move therewith and independent of the axle, driving gears carried on the wheels, driving pinions therefor mounted to move therewith, Cardan drive shafts flexibly connected to the differential gear and to the driving pinions for the wheels, brake drums carried with the Cardan shafts, and brake bands for said drums mounted to move with the frame.

2. In a motor vehicle, in combination with the frame, axle and wheels thereof, a differential gear mounted on the frame to move therewith and independent of the axle, driving gears on the wheels, driving pinions therefor mounted to move therewith, stub shafts connected operatively to said driving differential, Cardan shafts connected flexibly with the stub shafts and with the driving pinions for the wheels, brake drums mounted on the stub shafts in proximity to the differential gear, and brake bands for said drums mounted to move with the frame.

3. In a motor vehicle in combination with the frame and wheels thereof, a differential gear, a housing therefor mounted on the frame, stub shafts connected directly to the differential gear extending without the housing, internal gears on the wheels, driving pinions in mesh therewith, Cardan shafts interposed operatively between the driving pinions and the stub shafts, brake drums mounted on the stub shafts in proximity to the housing for the differential gear, and brake bands for the drums mounted on the housing.

This specification signed this 13th day of June, A. D. 1919.

MAURICE WALTER.